Oct. 14, 1947. L. SCHWORM, JR 2,428,996
ELECTRIC FOOD-WARMER
Filed March 7, 1945
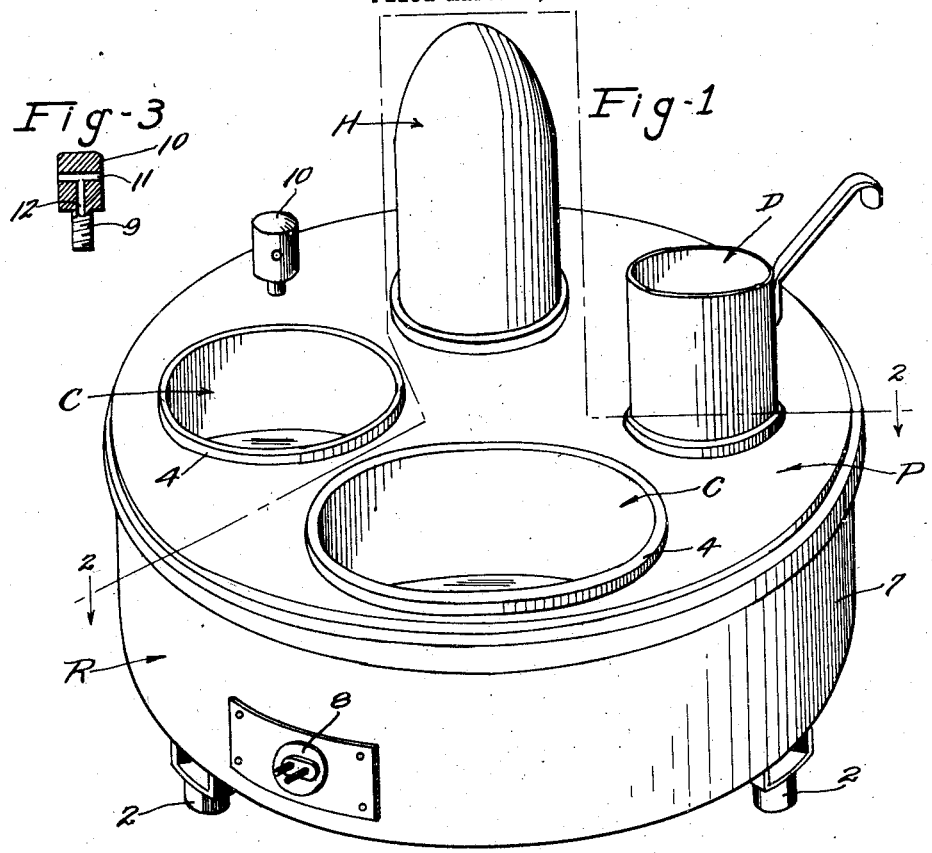
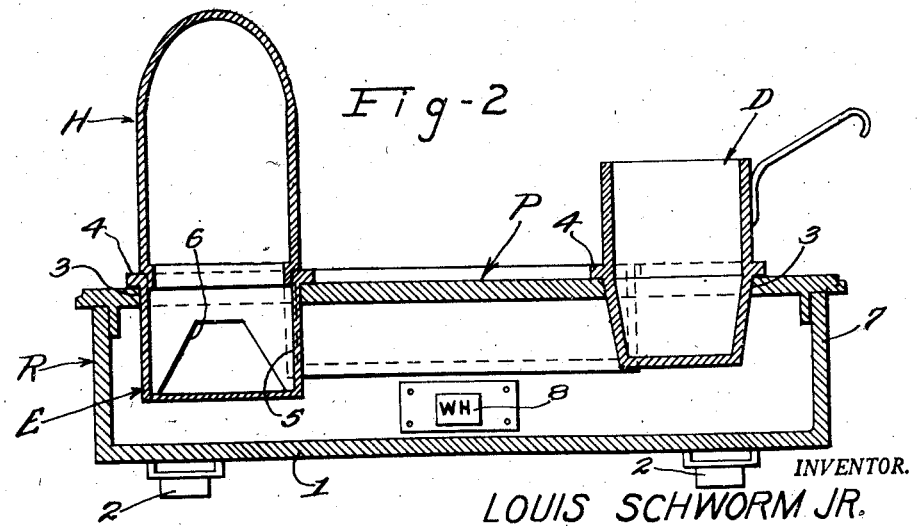
INVENTOR.
LOUIS SCHWORM JR.
BY
ATTORNEY Patented Oct. 14, 1947

2,428,996

UNITED STATES PATENT OFFICE 2,428,996

ELECTRIC FOOD WARMER

Louis Schworm, Jr., Washington, D. C.

Application March 7, 1945, Serial No. 581,392

2 Claims. (Cl. 219—19)

This invention relates to a heating appliance and it is primarily an object of the invention to provide an appliance of this kind which can be employed to advantage in the maintenance of foodstuffs in a warm condition, whereby the appliance is particularly advantageous for use in connection with the feeding of infants, in a sickroom, or the like.

Another object of the invention is to provide an appliance of this kind wherein desired functioning of the appliance is effected through the medium of a heated fluid and wherein the construction and assembly of the various parts is such as to assure the appliance being used with safety.

The invention consists in the details of construction and in the combination and arrangement of the several parts of my improved heating appliance whereby certain important advantages are attained, as will be hereinafter more fully set forth.

In order that my invention may be better understood, I will now proceed to describe the same with reference to the accompanying drawings, wherein:

Figure 1 is a view in perspective of an appliance constructed in accordance with an embodiment of my invention;

Figure 2 is a sectional view taken substantially on the line 2—2 of Figure 1, looking in the direction of the arrow; and Figure 3 is a sectional view taken through the safety element as herein employed, unapplied.

As disclosed in the accompanying drawings, R denotes a receptacle of glass, metal or such other material as may be desired and which has its top face open. In the present embodiment of the invention, the receptacle R is circular in plan although, if preferred, it may be of any other desired configuration. The receptacle R is of material depth and depending from the bottom wall 1 thereof are the suitably located supporting feet 2.

The open top of the receptacle R is adapted to be tightly closed by a top plate or lid P which also constitutes a tray for carrying the various containers desired. This plate or lid P at desired points spaced circumferentially therearound is provided with a plurality of openings 3 each of which is of a diameter determined by the size of a container to be inserted therethrough.

In the present embodiment of the invention, these openings 3 are four in number and snugly insertible through two of these openings 3 are the containers C having their tops open and in which is adapted to be placed such foodstuffs as desired, either solid or liquid, and which it is desired to maintain warm. Each of these containers C is of a depth to extend a material distance inwardly of the receptacle R but to terminate above the bottom 1 thereof.

In another of said openings 3 is inserted the lower portion of a cup-like container D while the remaining opening 3 is adapted to have inserted therethrough a container E. The containers D and E also have their tops open but the container E is adapted to have its open top face closed by an elongated hollow cap H, whereby the container E and applied cap H serve to effectively house a bottle of milk or other liquid adapted to be maintained in a warm condition.

Each of the containers C, D and E is provided therearound with a surrounding outstanding flange 4, the under face of which is machined or otherwise finished to assure close contact with the top surface of the plate or lid P and which surface is preferably polished or otherwise smoothly finished to assure an effective sealing of an opening 3 through which any one of the several containers may be inserted.

The side wall 5 of the container E in that portion which, when the container is applied, is below the plate or lid P or within the receptacle R is provided with one or more relatively large openings 6 to permit the admission within the chamber afforded by the container E and the applied cap H of a bottle of milk or the like, whereby the same will be effectively maintained warm as the result of the contact with the bottle of heated fluid within the receptacle R or the steam which may be generated within the receptacle R and fill the container E and the cap H above the water line within the receptacle R.

In practice, water is placed within the receptacle R to a depth about half way of the receptacle R and the lower portion of the side wall 7 of the receptacle R at a suitable point thereon carries a conventional electric heater 8 which extends as desired within the receptacle R and, of course, below the water level, whereby the water within the receptacle R may be effectively heated.

It is preferred that this electric heater 8 be of a type whereby the operating circuit therefor will be automatically broken when the temperature of the water reaches a predetermined degree. As the particular construction and operation of the electric heater forms no part of the present invention, it is not believed that a detailed description and operation thereof are required.

Carried by the plate or lid P, preferably at a marginal portion thereof, is a tubular member 9 which extends through the plate or lid P for communication with the interior of the receptacle R when the plate or lid P is applied.

The outer end of this member 9 is enlarged to provide a head 10 having disposed laterally therethrough a part 11 with which the bore 12 of the member 9 communicates. By this means steam as generated within the receptacle R may pass off and thus substantially eliminate the liability of any pressure being created within the receptacle R which might result in the blowing off of the applied plate or lid P or of any one of the applied containers.

It is also to be stated that the plate or lid P may be made of such material as will fully meet with the requirements of practice and this is also equally true of the containers C, D and E.

From the foregoing description it is thought to be obvious that a heating appliance constructed in accordance with my invention is particularly well adapted for use by reason of the convenience and facility with which it may be assembled and operated.

I claim:

1. A material warming appliance comprising a relatively shallow receptacle having supporting feet and an open top, the receptacle being designed to contain a liquid, an electrical resistance heater supported within the receptacle, a cover for the receptacle comprising a plate of an overall diameter greater than the receptacle and designed to rest upon the top thereof, the plate having a flange adapted to snugly fit within the open top of the receptacle to provide a relatively tight joint therewith, said top having openings formed therethrough, containers insertible in said openings and each having an encircling collar designed to rest upon the top of the cover, the receptacles being of a diameter to snugly fit their respective openings, and means for releasing vapor from within the receptacle.

2. A material warming appliance of the character stated in claim 1, in which said means comprises a tubular stem threaded through an opening in the receptacle cover and having a head provided with a transverse passage intersected by the tube of the stem for discharging vapor laterally.

LOUIS SCHWORM, Jr.

REFERENCES CITED

The following references are of record in the file of this patent:

UNITED STATES PATENTS

| Number | Name | Date |
| --- | --- | --- |
| 2,187,196 | Douglas | Jan. 16, 1940 |
| 2,259,519 | Ershler | Oct. 21, 1941 |